(12) United States Patent
Turnbull

(10) Patent No.: US 7,591,379 B2
(45) Date of Patent: Sep. 22, 2009

(54) SCREEN/MIXER

(76) Inventor: Sam Dominic Seaton Turnbull, Emu Point, Mangoplah (AU) NSW 2652

( * ) Notice: Subject to any disclaimer, the term of this patent is extended or adjusted under 35 U.S.C. 154(b) by 0 days.

(21) Appl. No.: 10/515,836

(22) PCT Filed: May 30, 2003

(86) PCT No.: PCT/AU03/00669

§ 371 (c)(1),
(2), (4) Date: Nov. 29, 2004

(87) PCT Pub. No.: WO03/101597

PCT Pub. Date: Dec. 11, 2003

(65) Prior Publication Data

US 2005/0173311 A1    Aug. 11, 2005

(30) Foreign Application Priority Data

May 31, 2002  (AU)  .................................. PS2708

(51) Int. Cl.
*B07B 1/49* (2006.01)
*B07B 1/06* (2006.01)

(52) U.S. Cl. .................. 209/419; 209/235; 209/279; 37/444

(58) Field of Classification Search .................. 209/418, 209/419, 274, 279, 281, 409, 415, 421; 37/341, 37/444, 445, 901, 904, 903; D15/25; 414/722, 414/725; 171/111, 116, 129, 135
See application file for complete search history.

(56) References Cited

U.S. PATENT DOCUMENTS

| 3,072,257 | A | * | 1/1963 | Hockenberry | ................ | 171/132 |
| 3,765,490 | A | | 10/1973 | Logue | | |
| 4,051,614 | A | * | 10/1977 | Diggs | ........................... | 37/409 |
| 4,157,956 | A | * | 6/1979 | Robinson | ..................... | 209/260 |
| 5,002,656 | A | | 3/1991 | Johansson | | |
| 5,172,498 | A | | 12/1992 | Wack | | |
| 5,241,764 | A | | 9/1993 | Modig | | |
| 5,311,684 | A | | 5/1994 | Van Dalfsen | | |
| 5,493,796 | A | | 2/1996 | Ballew et al. | | |

(Continued)

FOREIGN PATENT DOCUMENTS

DE          29823058        6/1999

(Continued)

*Primary Examiner*—Patrick H Mackey
*Assistant Examiner*—Mark Hageman
(74) *Attorney, Agent, or Firm*—MH2 Technology Law Group LLP

(57) ABSTRACT

A device (10) for sieving and/or mixing is disclosed which includes a base (12) and a container (13) mounted thereon for rotation about an axis which is substantially horizontal. The container has a peripheral wall (14) extending angularly about and longitudinally relative to the axis, and an opening (25) extending longitudinally relative to the axis to provide for movement of material into and out of said space. Means to drive the container angularly about the axis are provided so that any material which is introduced into the container may be processed as required by rotation thereof. The peripheral wall is configured with an internal baffle to prevent material from being delivered when the container is rotated one way, but delivers material from within said space through the opening when the container is moved angularly about its axis in the opposite direction being a predetermined direction of rotation for delivery.

13 Claims, 3 Drawing Sheets

U.S. PATENT DOCUMENTS

| | | |
|---|---|---|
| 5,732,827 A | 3/1998 | Dorscht |
| 5,743,030 A | 4/1998 | Sirr |
| 5,771,612 A | 6/1998 | Lynch |
| 6,138,837 A | 10/2000 | Santa Cruz et al. |
| 6,375,012 B1 | 4/2002 | Leyland et al. |
| 6,725,942 B2 | 4/2004 | Stevens |

FOREIGN PATENT DOCUMENTS

| | | |
|---|---|---|
| EP | 0 047 041 | 3/1982 |
| EP | 0 0106 412 | 4/1984 |
| EP | 05 254 41 | 2/1993 |
| EP | 0 750 071 A1 | 12/1996 |
| FR | 2 737 740 A1 | 2/1997 |
| FR | 2 737 741 A1 | 2/1997 |
| FR | 2 797 145 | 2/2001 |
| GB | 1 512 206 | 5/1978 |
| GB | 2 239 817 A | 7/1991 |
| GB | 2 337 216 | 11/1999 |
| GB | 2 401 096 | 11/2004 |
| JP | 09-196339 | 7/1997 |
| JP | 2001-205195 | 7/2001 |
| JP | 2002-021110 | 1/2002 |
| JP | 2002-061144 | 2/2002 |
| JP | 2003-189705 | 7/2003 |
| JP | 2003-221837 | 8/2003 |
| SU | 1 517 782 A1 | 10/1989 |
| WO | WO 92/04135 | 3/1992 |

* cited by examiner

SCREEN/MIXER

TECHNICAL FIELD

The present invention relates to devices that can sieve and/or mix granular material.

BACKGROUND OF INVENTION

Typically, devices that sieve granular material, also known as screens, are discrete pieces of apparatus and are generally not portable. In respect of mixers, such as cement and concrete mixers, the devices are either very large truck-mounted drums or alternatively small trailer type mixers. In respect of the smaller trailer type mixers, the inclination of the drum needs to be changed in order to deliver the contents from within the drum.

It would be advantageous in many situations, if such a device were able to be used in conjunction with a front end loader apparatus or similar equipment including earth moving or agricultural equipment, so that material could be scooped up as required, processed and deposited elsewhere as required. In such arrangements, it would also be advantageous if the device operated in essentially one plane or having only one form of motion (eg rotation), without the need to have to tip or to be inclined so as to empty the contents of the device, thereby reducing the complexity of any associated drive means.

OBJECT OF THE INVENTION

It is an object of the present invention to provide an alternative sieving device or mixer relative to the above-discussed devices, overcoming some or all of the inherent problems and taking into account where appropriate the above identified proposed advantages. At the very least, the device of the invention is an alternative to presently known means for sieving and/or mixing material.

DISCLOSURE OF THE INVENTION

There is disclosed herein a device for sieving and/or mixing including:
  a base;
  a container mounted on the base for rotation about an axis which is substantially horizontal, said container having a peripheral wall extending angularly about and longitudinally relative to said axis, and an opening extending longitudinally relative to said axis to provide for movement of said material with respect to said space;
  means to drive said container angularly about said axis so that any material which is introduced into the container may be processed as required by rotation thereof; and wherein
  said peripheral wall delivers material from within said space through said opening when said container is moved angularly about said axis in a predetermined direction.

The base may be free standing so that the device functions as a stand alone piece of equipment, it or may itself be in the form of a suitable support mechanism or otherwise have suitable mounting means for attachment to some other apparatus. Thus, in one preferred form of the invention, the device is able to be mounted on the front of a front-end loader, prime mover or other similar and suitable vehicle (including agricultural and earth moving equipment), from which it may derive its drive means.

More preferably, especially for use with such vehicles, said peripheral wall includes a tray portion in the form of a blade or having a cutting edge, located radially outwardly of said opening and adjacent said opening. The primary purpose of the tray is to act as a scoop so that when the device is pushed into the material to be sieved or mixed (using the motive power of the front end loader or similar apparatus), the material is caused to enter the container in a scooping fashion. The tray may have a simple straight leading edge, or be provided in known fashion with teeth or the like to facilitate entering or breaking up material prior to causing it to enter the container.

Preferably, said device is a sieve, with said peripheral wall having perforations in at least a portion thereof through which sieved particle material is to pass. Preferably, said peripheral wall includes a mesh portion and a tray portion, the tray portion functioning as described above.

Preferably, the container is provided with a catch tray which is located radially outwardly of and extending externally from the peripheral wall in the lower region thereof and opposite the opening, which acts so as to prevent material (in the case of utilising the device as a sieve), from merely passing straight through the back of the container (the back being understood as relative to the front where the opening is located). Thus material will be retained in the device, prior to any rotation of the container, notwithstanding that some material may initially pass through a portion of the perforated wall, it being prevented from leaving the device altogether by virtue of the catch tray, even when the device is being moved to another location where the sieved material is to be deposited. Although a region of the peripheral wall in this case could be provided without perforations, the catch tray thus maximises the available sieve area within the peripheral wall proper.

With advantage, the peripheral wall comprises one or more removable segments or panels, so that one or more segments or panels can be interchanged, for example between solid panels suitable for mixing operations and mesh panels or the like suitable for sieving. In this way, a number of alternate mesh sizes may also be employed for different sieving specifications in order to achieve different results.

In one preferred embodiment, said peripheral wall retains said material within said space so that said material is processed (sieved or mixed as the case may be) within that space when the container is rotated in a direction opposite to said predetermined direction in which it will deliver material out of the container. It will be appreciated that "retains" means, in the case where sieving is performed, retaining that material which will not pass through the sieve.

In this embodiment retention of the material is preferably facilitated by an internal baffle extending from the peripheral wall radially inwardly in the region of the opening and from that side of the opening opposite the external tray, so that on rotation of the container in the direction opposite to the predetermined direction in which material is delivered from the opening, material is prevented from falling from the opening as the container rotates in that opposite direction. In other words, once material is collected in the container, for example by pushing the device into a pile of material to be processed, simply rotating the container one way will cause the material to be retained (or more accurately in the case of sieving, will cause that portion of material which does not pass through the sieve to be retained), whilst simply reversing the direction of rotation of the container, will cause the remaining or otherwise retained material to be delivered out of the container.

It will of course be appreciated that this will generally involve three locations to complete a cycle (for sieving at least), namely a pick-up location, processing location and a deposit location. Thus in a typical sieving process, the device is first brought into contact with a pile of material to processed simply by pushing the open side of the container into the pile in a typical scooping action reminiscent of many such operations with front end-loaders etc. Then the device is moved to a second location, where the container is rotated opposite the predetermined rotation for delivery, during which time finer material is allowed to fall through the screens or perforations of the device. After the finer material has fallen through, then the device is moved to a third location where the rotation of the container is reversed and the larger retained material is let fall from the opening. A typical mixing operation is similar except that the second location is not required, ie where sieved material is allowed to fall, as all the material will remain when mixing.

Alternatively, in a second embodiment, there is provided suitable closing means to close the opening in the peripheral wall, so that said peripheral wall acts in conjunction with the closing means to retain said material within said space so that said material is processed (sieved or mixed as the case may be) within said space when the closed container is rotated in either a direction opposite to said predetermined direction, or in this case, depending on the particular arrangement, in either direction. Again "retains" here means in the case of sieving, retaining material which will not pass through the sieve. It will also be understood that in this embodiment, the closing means may in fact be reminiscent of the internal baffle described in the previous embodiment, but which is hinged for example to act not only as a baffle but as a door if require.

Thus in one form of the invention, the longitudinal opening of the container is permanently available or open, for example in a fixed or static arrangement. In this embodiment, the material once sieved or mixed (ie remaining material in the case of sieving) is only able to be delivered from within the container via the opening when the container is rotated in the predetermined direction, whilst the said material to be sieved or mixed otherwise remains inside the space of the container when it is rotated in the opposite direction (except that which passes through the sieve if that operation is performed). Put simply, rotating the container one way retains material, reversing the rotation causes it to empty.

In the second embodiment, the longitudinal opening is able to be closed, for example by a door or flap, so that once material has been collected in the container and the opening closed, the container may in principle be rotated in either direction to sieve or mix the material. However, with advantage, two counteracting drives, eg hydraulic drives, may be utilised. The first and more powerful causes the container to rotate opposite the predetermined delivery direction, whilst the second acts in the opposite direction on the door or flap effectively acting like a brake to keep the door closed, when the container rotates in that direction. However, reversing the direction of the main drive to the container, so that it rotates in the predetermined direction for delivery, will causing both drives to act in the same direction, thereby causing the door to be opened, thereby facilitating delivery from within the container. Such drive arrangements are possible especially utilising hydraulic means, although other suitable clutch means may be utilised.

It will also be understood that rotation of the container as described includes not only simple continuous rotation, but also intermittent rotation, and in some cases where rocking, vibrating or shaking are required (especially desirable during sieving), appropriate intermittent back and forth rotation might be effected. Thus, rotation may include, during the course of an operation to mix or sieve, any one or more of such motions as described. Thus for example even a simple scooping of material and shaking of the material (without necessarily performing full revolutions of the container is envisaged in some circumstances.

There is further disclosed herein:
  a base;
  a container mounted on the base for rotation about an axis that has a direction of extension that is at least partly horizontal, said container having a peripheral wall extending angularly about and longitudinally relative to said axis, and an opening extending longitudinally relative to said axis to provide for movement of said material with respect to said space;
  means to drive said container angularly about said axis; and wherein
  said peripheral wall includes a tray portion located radially outwardly of said opening and adjacent said opening.

BRIEF DESCRIPTION OF THE DRAWINGS

Preferred forms of the present invention will now be described by way of example with reference to the accompanying drawings wherein.

DETAILED DESCRIPTION OF THE PREFERRED EMBODIMENTS

Figure 1:
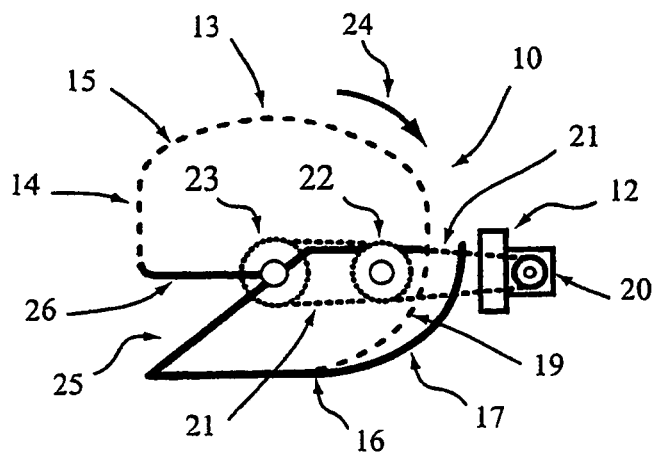
FIG. 1 is a schematic side elevation of a device to sieve particle matter.
Figure 4:
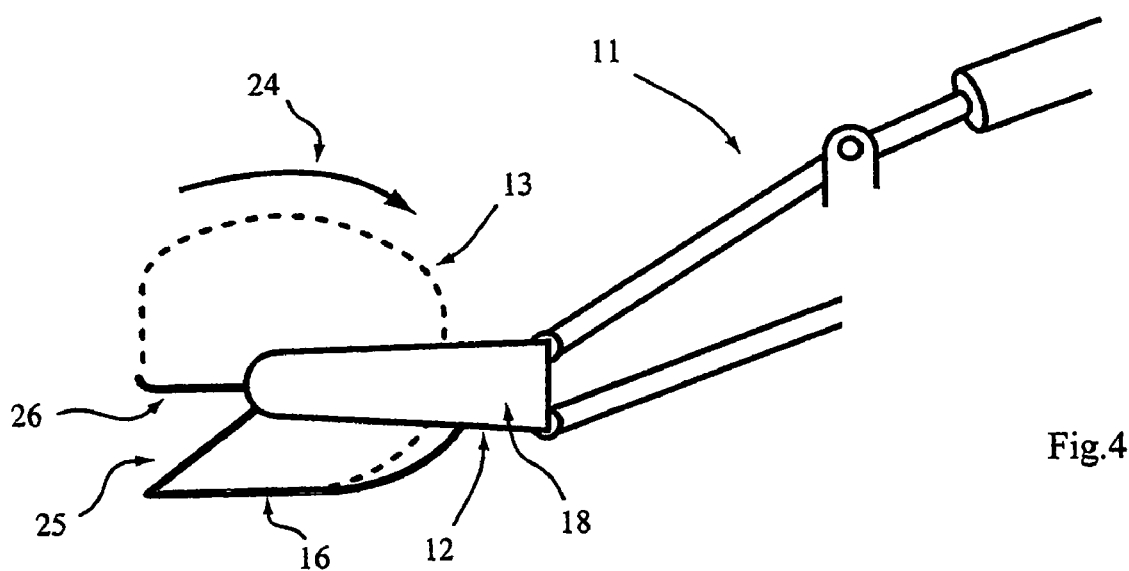
FIG. 4 is a schematic side elevation of the device of FIG. 1 mounted on a front end loader or other suitable prime mover.

Referring generally to the Figures and in particular FIG. 1, there is schematically depicted a sieve 10. The sieve 10 may be mounted on an associated stand or base, or may be adapted to be attached to a front end loader or other prime mover 11 (FIG. 4). The prime mover 11 may be any suitable piece of agricultural equipment or alternatively a piece of earth moving equipment.

The sieve 10 includes a base 12 which rotatably supports a container 13. The container 13 is mounted on the base 12 for rotation about a generally horizontal axis. The container 13 has a peripheral wall 14 including an arcuate mesh segment 15 extending to an external collecting tray segment 16. In that respect, the tray segment 16 has a rearwardly extending portion 17 acting as a catch tray, generally coextensive with a portion of the mesh segment 15, but spaced a little away therefrom except in the region along which the two in fact join.

The base 12 includes a pair of generally parallel coextensive arms 18 which directly support the container 13. Mounted within one of the arms 18 is a drive assembly 19. The drive assembly 19 includes chains 21 that drive a series of sprockets including sprockets 22 and 23, with the sprocket 23 being coupled to the container 13 to drive the container in this case. Any suitable drive arrangement may be employed in known fashion. The motor 20 may be operated in either rotational direction.

In operation of the above sieve 10, the tray segment 16 is loaded with particle material to be sieved. Thereafter, the motor 20 is activated to cause rotation of the container 13 in the direction of the arrow 24. For example, the container 13 could be continually rotated in the direction of the arrow 24 so that material smaller than a predetermined size will fall through the mesh segment 15. Alternatively, the container 13 may be merely inverted and then angularly oscillated so that again the smaller material falls through the mesh segment 15. When the sieving operation is complete the operator reverses the direction of the motor 20 so that it rotates in the opposite direction to the arrow 24. The material then contained within the container 13 will exit the container 13 by means of the opening 25. In that respect, it should be appreciated that the opening 25 extends generally parallel to the rotational axis. The wall 14 also extends generally parallel to the rotational axis and extends angularly about the rotational axis. The peripheral wall 14 further includes an internal baffle 26 spaced from the tray 16, with the opening 25 being located between the tray 16 and baffle 26. In respect of the portion 17 it should be appreciated that it is spaced radially outward from the segment 15 relative to the rotational axis.

Figure 2:
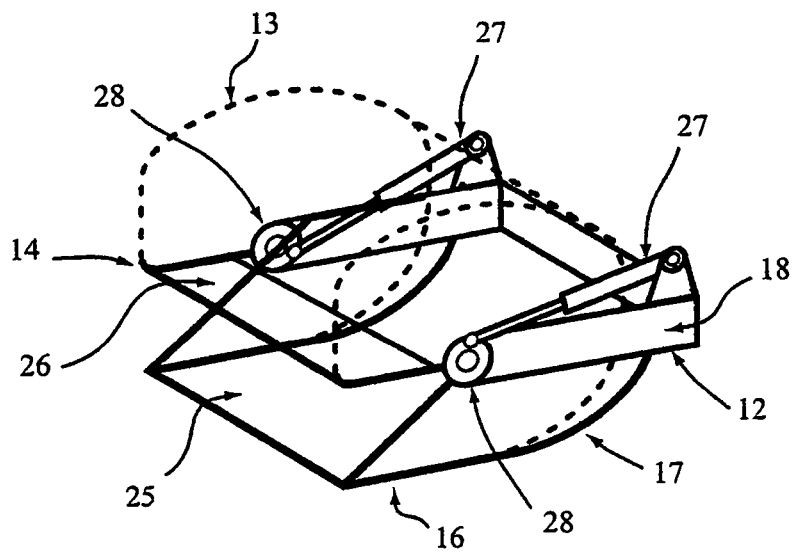
FIG. 2 is a schematic perspective view of a modification of the device of FIG. 1.

In the modification of FIG. 2, the drive assembly 19 is replaced with a pair of hydraulic or pneumatic cylinders 27 which cause rotation or angular oscillation of the container 13 by means of crank members 28.

Figure 3:
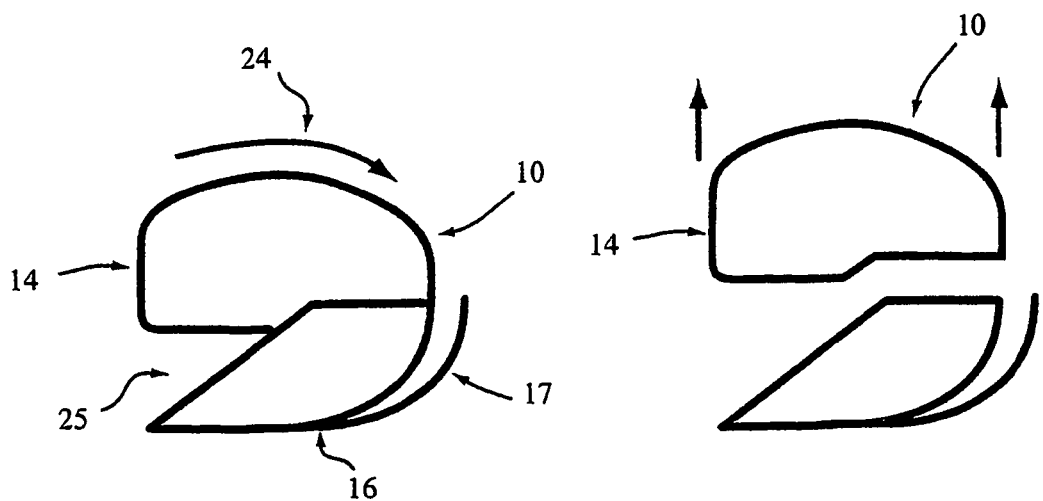
FIG. 3 is a schematic side elevation of a mixing device.

In FIG. 3 there is schematically depicted a modification of the container 13. In this embodiment the peripheral wall 14 is not a mesh material but would preferably be sheet material. The container 13 could be used to mix materials such as cement and concrete. Mixing would occur by rotation of the container 13 in the direction of the arrow 24. Reverse direction would then deliver the mixed material out through the opening 25.

Figure 5:
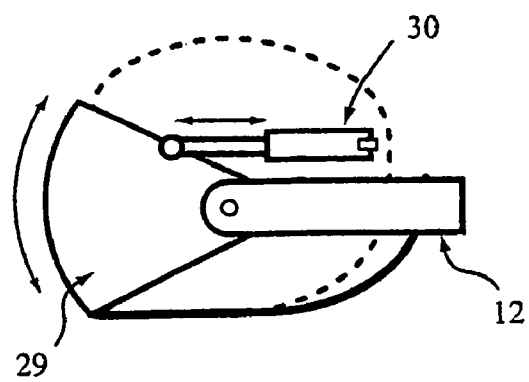
FIG. 5 is a schematic side elevation of a modification of the device of FIG. 4.

In the modification of FIG. 5, the container 13 of the sieve 10 is modified by removal of the internal baffle 26 and the inclusion of a door 29. The door 29 is movable by means of one or more hydraulic or pneumatic cylinders 30, between a closed position closing the opening 25, and an open position exposing the opening 25. In respect of this embodiment it should be appreciated that although it is described and illustrated as being a sieve 10, it could also be adapted as a mixer as described with reference to FIG. 3.

In respect of the above preferred embodiments it should be appreciated that the tray portion 16 is located radially outwardly of said opening and adjacent said opening so that the container 13 may be moved to engage a supply of material to be sieved or mixed, and then the container 13 moved while retaining the material on the tray portion 16, rearward extension 17 preventing material from falling through until rotation is commenced.

Figure 6:
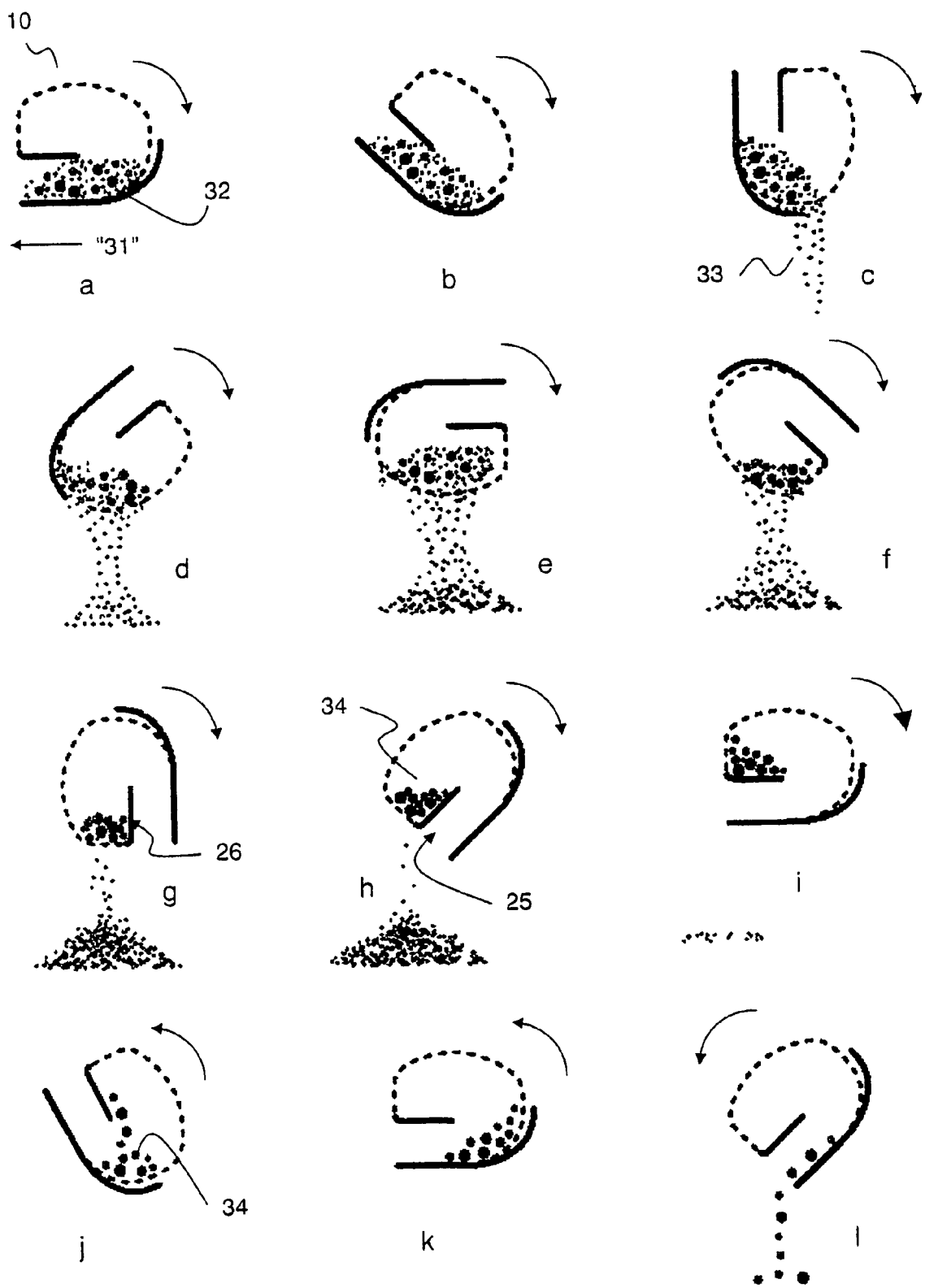
FIG. 6 is a series of schematic diagrams showing the sequence of operation of one embodiment of the invention operating as a sieve.

Referring to FIG. 6, there is depicted diagrammatically a series of steps a to 1 for a typical sieving process, in which steps a to i show rotation of the device 10 in a clockwise direction (opposite the predetermined direction of rotation for delivery and steps j to l show rotation in a counter clockwise direction (according to the predetermined direction of rotation for delivery). From a resting position in step a where for example material 32 is loaded into the device 10 by pushing it in the direction of arrow "31", the device 10 is rotated clockwise (steps b to i) which causes the material 32 to be sieved, smaller material 33 falling through the mesh segment 15 of the container 13. As shown in steps g to i material intended to be retained 34 is prevented from falling through the opening 25 by virtue of the internal baffle 26. Once the material 32 is sufficiently sieved, the motor (not shown) is reversed and in steps j to l, the remaining material 34 is caused to be delivered from the opening 25.

Throughout the specification any use of the word "comprise" and its derivatives is intended to have an inclusive rather than exclusive meaning unless the context requires otherwise.

INDUSTRIAL APPLICABILITY

The invention has industrial applicability at least in relation to devices for sieving and/or mixing.

The foregoing describes only one embodiment of the present invention, and modifications obvious to those skilled in the art can be made thereto without departing from the scope of the present invention.

The invention claimed is:

1. A device for sieving and/or mixing, comprising:
   a base;
   a container mounted on the base for rotation about an axis which is substantially horizontal, the container having a peripheral wall extending angularly about and parallel to the axis, and an opening extending longitudinally relative to the axis to provide for movement of material into and out of the container;
   a drive assembly for driving the container angularly about the axis so that material which is introduced into the container may be processed as required by rotation thereof; and
   a catch tray located radially outwardly of and extending externally from the peripheral wall in a lower region thereof and opposite to the opening, which prevents material from passing through a back portion of the container,
   wherein the peripheral wall delivers the material through the opening when the container is moved angularly about the axis in a predetermined direction,
   wherein the peripheral wall retains and processes the material within the container when the container is rotated in a direction opposite to the predetermined direction, and
   wherein retention of the material within the container is facilitated by an internal baffle which is connected to, and extends radially inwardly from the peripheral wall to the axis in a region near the opening.

2. The device according to claim 1, wherein the base is free standing so that the device functions as a stand alone piece of equipment.

3. The device according to claim 1, wherein the base is in a form of a support mechanism including mounting means for attachment to another apparatus.

4. The device according to claim 3, wherein the device is mounted on a front of a front-end loader, a prime mover, or other similar vehicle, from which the device derives the means to drive the container.

5. The device according to claim 1, wherein the peripheral wall includes a tray portion in a form of a blade or a cutting edge located radially outwardly and adjacent to the opening.

6. The device according to claim 5, wherein the tray portion has a straight leading edge.

7. The device according to claim 5, wherein the tray portion includes teeth to facilitate entering or breaking up of the material prior to entering the container.

8. The device according to claim 2, wherein the device functions as a sieve with the peripheral wall having perforations in at least a portion thereof through which sieved particle material is passed.

9. The device according to claim 8, wherein the peripheral wall includes a tray portion.

10. The device according to claim 8, wherein the peripheral wall includes one or more removable segments or panels configured to be interchanged between solid panels for mixing operations and mesh panels for sieving.

11. The device according to claim 10, further comprising: closing means for closing the opening in the peripheral wall to retain and process the material within the container when the container is rotated in either the predetermined direction or the direction opposite to the predetermined direction.

12. The device according to claim 11, wherein the closing means is a baffle or a door which prevents the material from leaving the container when rotated in the direction opposite to the predetermined direction.

13. The device according to claim 12, wherein opposing hydraulic drives open the door when the container is rotated in the predetermined direction to facilitate delivery and close the door when the container is rotated in the direction opposite to the predetermined direction.

* * * * *